Dec. 4, 1945.   R. HACKNEY   2,390,248
SPREADER FOR WATER HEATERS
Filed March 18, 1944

INVENTOR.
RAY HACKNEY,
BY
ATTORNEY

Patented Dec. 4, 1945

2,390,248

UNITED STATES PATENT OFFICE 2,390,248

SPREADER FOR WATER HEATERS

Ray Hackney, Glendale, Calif.

Application March 18, 1944, Serial No. 527,133

3 Claims. (Cl. 122—18)

This invention relates to spreaders and circulators for water heaters and has particular reference to a spreader finding particular utility when employed with a storage tank type of water heater to assist in the rapid heating of the water.

It is common practice in the construction of storage tank types of water heaters to employ a device known as a "spreader" situated between the tank and the burner which is positioned directly below the tank. The spreader comprises a hollow bulb-like device upon which the flames from the burner play and is so connected with the tank that the water heated in the spreader rises directly through a separate pipe to the top surface of the storage tank to be immediately available for drawing off in the hot water supply line.

In those localities where the water contains considerable calcium and magnesium salts or other scale forming materials, it was found that after a short period of operation a sufficient quantity of scale would be built up on the interior of the spreader to effectively insulate the water contained in the spreader from the heated walls of the spreader, thus clearly reducing the desirable fast heating of the water upon the initial lighting of the burner. In some cases, the quantity of scale grew so great as to completely plug up the interior of the spreader and to cause it to break. For this reason, many water heaters of the storage tank type omit the spreader and allow the flames of the burner to play directly upon the bottom of the tank. This subjects the tank to the oxidizing effect of the direct flames and also requires a considerably longer time for the heating of a usable quantity of water than does the types using the spreader.

It is, therefore, an object of my invention to provide a spreader and circulator which overcomes the above noted disadvantages by providing an interior construction operating to flush out the interior of the spreader each time water is drawn from the tank.

It is also an object of my invention to provide a spreader and circulator of the character set forth in the preceding paragraph in which the water inlet for supplying cold water to the tank is connected to communicate directly with the interior of the spreader.

It is an additional object of my invention to provide a spreader of the character set forth in the preceding paragraphs which includes a water inlet nipple at the bottom of the spreader for connection to a water supply line and in which an integrally formed inverted V-shaped baffle is extended across the inlet opening to direct oppositely flowing streams of water against the sides of the spreader to effect a flushing out of the spreader.

It is a still further object of my invention to provide in a spreader of the character set forth in the preceding paragraphs an upper connecting neck for attaching the spreader to the tank proper which is partitioned by means of vertical baffles to provide a re-circulating connection between the tank and the hot water line leading to the upper portion of the tank, the latter line communicating with the spreader at substantially the same elevation as does the communication to the lower portion of the tank.

Other objects and advantages of my invention will be apparent from a study of the following specification, read in connection with the accompanying drawing, wherein.

Figure 1:
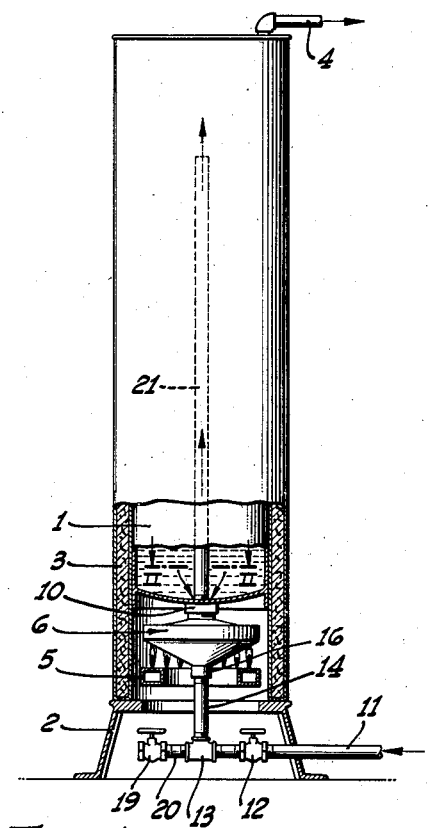
Fig. 1 is a side elevational view partly in section illustrating a conventional form of storage tank type water heater employing the spreader and circulator of my invention.

Referring to the drawing, I have illustrated in Fig. 1 a more or less conventional form of storage tank type water heater as comprising a storage tank 1 suitably supported as upon a base or legs 2 and covered with a heat insulating cover 3. Hot water is drawn from the tank through a hot water supply line 4 communicating solely with the upper portion of the tank 1. The water in the tank is heated by means of a burner 5 disposed below the tank 1 and adapted to use gas, oil or other combustible mixture.

Figure 3:
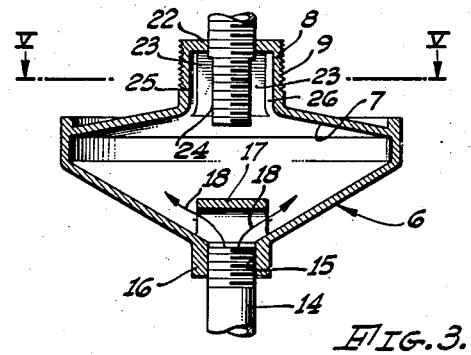
Fig. 3 is a vertical sectional view through the spreader taken substantially along the line III—III of Fig. 2.
Figure 4:
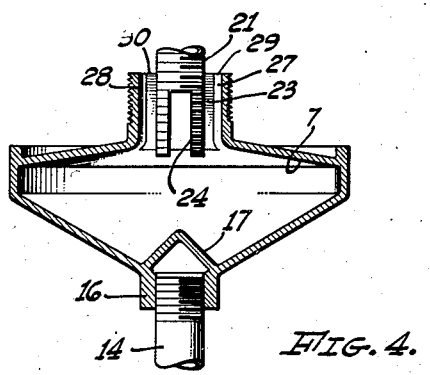
Fig. 4 is a view similar to Fig. 3 but oriented at right angles thereto, Fig. 4 being taken along the line IV—IV of Fig. 2.
Figure 2:
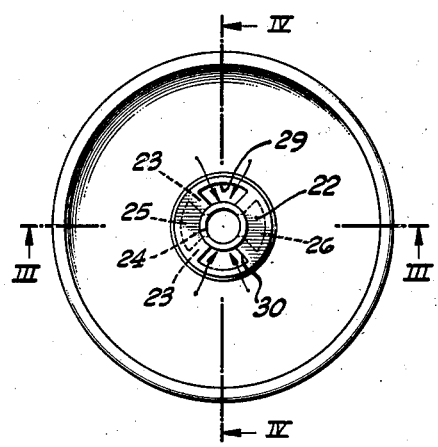
Fig. 2 is a cross sectional view taken substantially along the line II—II of Fig. 1 showing the spreader in plan.

Between the burner 5 and the bottom of the tank 1 I place, as shown in Fig. 1, a spreader and circulator indicated generally by the reference character 6. The spreader comprises, as is shown in Figs. 3 and 4, a cone-shaped hollow member defining an interior space 7 and terminating in an upper cylindrical portion 8 which is threaded as indicated at 9 to be received within a threaded boss 10 provided on the bottom of the tank 1 and communicating with the interior thereof. A cold water supply line 11 is connected through a shut-off valve 12 and T-fitting 13 to a vertically rising nipple 14 which is threadedly engaged as shown at 15 with a boss 16 formed on the bottom of the spreader 6. The nipple 14 communicates directly with the interior space 7 within the spreader and so conveys cold water to the interior of the spreader as rapidly as hot water is drawn from the tank through the hot water line 4.

The flushing action referred to hereinbefore is obtained by placing over the inlet opening an inverted V member 17, two sectional views of which are shown in Figs. 3 and 4. It will be noted that water entering the supply nipple 14 will, by virtue of the V-shaped baffle 17, be diverted in the direction indicated by the arrows 18 in Fig. 3. This serves to direct relatively high velocity streams of water over the inside surface of the lower portion of the spreader (that being the portion upon which the flames from the burner 5 directly impinge and which is the surface most likely to acquire an accumulation of scale). These streams of water serve to dislodge the scale from the spreader as rapidly as it is formed, thus preventing the scale from tightly adhering to the surface of the spreader. The scale, because of its weight, tends to collect in the bottom of the spreader near the inlet opening and may be removed at intervals by flushing the spreader through the opening of a flush valve 19 which is connected as by a nipple 20 to the T-fitting 13. The shut-off valve 12 is preferably closed before the valve 19 is opened.

Reference has been made hereinbefore to enhancing the heating of the water within the tank by re-circulating the water from the tank through the spreader and by conveying the water heated in the spreader to the upper surface of the tank. This is accomplished by means of a riser 21 which extends into the spreader as shown in Figs. 3 and 4 and which extends, as shown, in Fig. 1, to a point near the top of the tank. The water heated in the spreader rises by convection through the riser 21 and so reaches the top of the tank at a temperature nearly equalling that at which it left the spreader.

Figure 5:
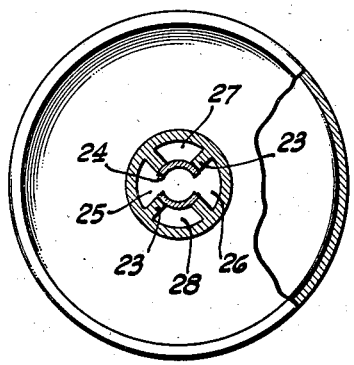
Fig. 5 is a sectional view taken substantially along the line V—V of Fig. 3 through the neck portion of the spreader illustrating the internal baffle arrangement used for establishing a re-circulating connection between the spreader and the tank.

Without the riser 21, the heated water, because of its intimate contact with the cold water in the bottom of the tank, would be greatly cooled during its passage to the upper end of the tank. A re-circulation of the water in the tank and the spreader is obtained by forming the neck 9 with an upper closure plate 22 which is threaded to receive the threaded lower end of the riser 21 to support the same. From the closure 22 there depend a plurality of vertical baffles 23, four of such baffles being shown in Fig. 5. The lower end of the riser 19 is slotted as shown at 24 to communicate with diametrically opposed chambers 25 and 26 defined by the baffles 23. The alternate chambers 27 and 28 communicate with the interior of the tank 1 by reason of openings 29 and 30 formed in the closure 22. The slots 24 extend upwardly to a point closely adjacent the under surface of the closure 22. Since these slots communicate with the closed chambers 25 and 26, the heated water which rises in the pipe 21 is taken from the highest point of the spreader 6. This point is nearly at a level with the bottom of the tank 1.

This construction insures that only the hottest water available in the spreader 6 is conveyed to the top of the storage tank. This water is, of course, displaced by the cold water entering the chambers 27 and 28 of the spreader from the tank 1 through the openings 29 and 30. This water is shielded from the rising hot water by the baffles 23.

From the foregoing it will be observed that I have provided an improved spreader and re-circulator for storage type tank water heaters and attention is directed particularly to the arrangement of the baffle 17 which serves to direct streams of incoming water against the walls of the spreader to prevent the accumulation of scale deposits on the spreader walls.

Attention is also directed to the re-circulating arrangement including the vertical baffles 23 and the slotted riser 21 by means of which delivery of adequately heated water is conveyed to the upper part of the storage tank 1 in the shortest possible time.

While I have shown and described the preferred embodiment of my invention, I do not desire to be limited to any of the details of construction shown or described herein, except as defined in the appended claims.

I claim:

1. In a water heater spreader and circulator for use with storage tank type water heaters, the combination of: a bulb-like structure defining an interior chamber positioned below the tank of said water heater; a tubular connecting means for securing said structure to said tank; a riser extending downwardly from the upper portion of said tank through said tubular connecting means and into the interior of said chamber, the lower end of said riser being slotted upwardly to a point near the upper end of said tubular connecting means; a plurality of vertically extending baffles interposed between said connecting means and said riser; and a closure extending across the upper part of said connecting means to close off the annular space between said connecting means and said riser, said closure means being perforated to provide a fluid passage between the bottom portion of said tank and the spaces within said connecting means separated from the slots in said riser by said vertical baffles.

2. In a water heater spreader for use with a storage tank for storing water heated in the spreader, the combination of a hollow bulb-like structure defining an interior water spreader chamber, means on said structure for connecting the same to the tank defining a passageway intercommunicating the tank and the chamber, means on said structure separate from said connecting means defining a water inlet passage for water from a water supply line, and means associated with said last named means for directing the incoming water from the supply line against the interior walls of said structure by the force of the pressure in said water supply line whereby the incoming water will scour the walls and prevent accumulation in the spreader of precipitates from the water.

3. In a water heater spreader for use with a storage tank for storing water heated in the spreader, the combination of a hollow bulb-like structure defining an interior water spreader chamber, means on said structure for connecting the same to the tank defining a passageway intercommunicating the tank and the chamber, means on said structure separate from said connecting means defining the sole water inlet passageway from a water supply line to the tank, and means associated with said last named means for directing the incoming water from the supply line against the interior walls of said structure by force of the pressure in said water supply line whereby the incoming water will scour the walls and prevent accumulation in the spreader of precipitates from the water.

RAY HACKNEY.